United States Patent
Bhandari et al.

(10) Patent No.: US 7,483,448 B2
(45) Date of Patent: Jan. 27, 2009

(54) METHOD AND SYSTEM FOR THE CLOCK SYNCHRONIZATION OF NETWORK TERMINALS

(75) Inventors: Rajan Bhandari, Newbury (GB); Miguel Dajer, Succasunna, NJ (US); Mahendra Tailor, Harrow (GB)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 790 days.

(21) Appl. No.: 10/797,915

(22) Filed: Mar. 10, 2004

(65) Prior Publication Data

US 2005/0201421 A1    Sep. 15, 2005

(51) Int. Cl.
H04J 3/06    (2006.01)

(52) U.S. Cl. .................. 370/503; 370/519; 370/510

(58) Field of Classification Search .......... 370/501, 370/519, 510, 513, 541, 503, 498
See application file for complete search history.

(56) References Cited

U.S. PATENT DOCUMENTS

| | | |
|---|---|---|
| 4,005,266 A | 1/1977 | Lehr et al. |
| 6,246,702 B1 | 6/2001 | Fellman et al. |
| 6,373,834 B1 * | 4/2002 | Lundh et al. ................ 370/350 |
| 6,449,290 B1 | 9/2002 | Willars et al. |
| 6,577,872 B1 | 6/2003 | Lundh et al. |

FOREIGN PATENT DOCUMENTS

EP    05 25 1009    10/2005

OTHER PUBLICATIONS

Mills D L: "Internet Time Synchronization: The Network Time Protocol" IEEE Transactions on Communications, IEEE Inc. New York, US, vol 39, No. 10, Oct. 1, 1991, pp. 1482-1493, XP000275311 ISSN: 0090-6778.

* cited by examiner

*Primary Examiner*—Ricky Ngo
*Assistant Examiner*—Dady Chery

(57) ABSTRACT

A method and system for network terminal clock synchronization includes determining a respective round trip delay time from a master terminal to each slave terminal and offsetting the clock of each slave terminal by an amount proportional to the respective determined round trip delay time such that the master terminal and each of the slave terminals have substantially the same point of reference in time. The method and system further include, in response to a trigger signal, determining a respective offset between the master clock of the master terminal and the clocks of each of the slave terminals and offsetting the clocks of each of the slave terminals by an amount proportional to the determined respective offset to synchronize the clocks of each of the slave terminals to the master clock of the master terminal.

11 Claims, 3 Drawing Sheets

METHOD AND SYSTEM FOR THE CLOCK SYNCHRONIZATION OF NETWORK TERMINALS

FIELD OF THE INVENTION

This invention relates to the field of data networks and, more specifically, to a method and system for synchronizing the clocks of terminal devices in a data network.

BACKGROUND OF THE INVENTION

Recent developments and advances in information technologies have led to new and unanticipated problems. In particular, transfer of data from a server to a requesting client presents certain complication. For example, video data comprises a series of still frames which must be played one after another in a predefined and well regulated time sequence. Accordingly, information relating to the image data must be transferred along with information relating to the timing of playback events. Proper transmission of video images requires a scheme to preserve signal timing attributes from a transmitting station to a receiving station.

For proper play-back, an audio-video signal is preferably played out at the same rate which it is transmitted. This is especially important in interactive systems where "real-time" properties are maintained. If a receiver clock is independent from a transmitter clock then the receiver may play frames slightly faster than it receives them and lead the system into a data starvation condition. Alternatively, if the receiver plays frames too slowly, then a data overflow condition may occur at a data buffer having a limited size.

In certain transmission networks a data stream is divided into many portions or "packets" and transmitted along various paths of the network. These packets may be subject to time delays which are random in length. Sometimes and herein referred to as "jitter", random time delays are necessarily inherent in networks which transmit data in data subsets. Each data packet may arrive at a receiver with a total transmission time which may vary from packet to packet. Depending upon the network path and network congestion conditions, transmission time delays may be highly different between packets. For audio-video data to be useful, it must be transmitted through the packet network and played back in a manner where the time delays or network jitter does not show up as artifacts in the presentation level play back. In order to achieve this, it is necessary that a time base of the transmitting station be replicated at the receiver and thus the "clocks" of the terminal end are said to be synchronized.

SUMMARY OF THE INVENTION

The present invention solves the deficiencies of the prior art by providing a method and system for the synchronization of the clocks of terminals in a data network.

In one embodiment of the present invention, a method for synchronizing the clocks of network terminals in a network includes determining a respective round trip delay time from a master terminal having a master clock to each of the other (slave) terminals of the network and offsetting the clock of each of the slave terminals by an amount proportional to the respective determined round trip delay time such that the master terminal and each of the slave terminals have substantially the same point of reference in time. The method further includes, in response to a trigger signal, determining a respective phase and frequency offset between the master clock of the master terminal and the clocks of each of the slave terminals and offsetting the clocks of each of the slave terminals by an amount proportional to the determined respective offset to synchronize the clocks of each of the slave terminals to the master clock of the master terminal.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention advantageously provides a method and system for the synchronization of terminal clocks in a data network. Although various embodiments of the present invention are described herein with respect to the synchronization of the clocks of slave terminals to the clock of a master terminal in a packet network, the specific embodiments of the present invention should not be treated as limiting the scope of the invention. It will be appreciated by those skilled in the art informed by the teachings of the present invention that the concepts of the present invention may be advantageously applied in substantially any network for the synchronization of terminal clocks.

Figure 1:
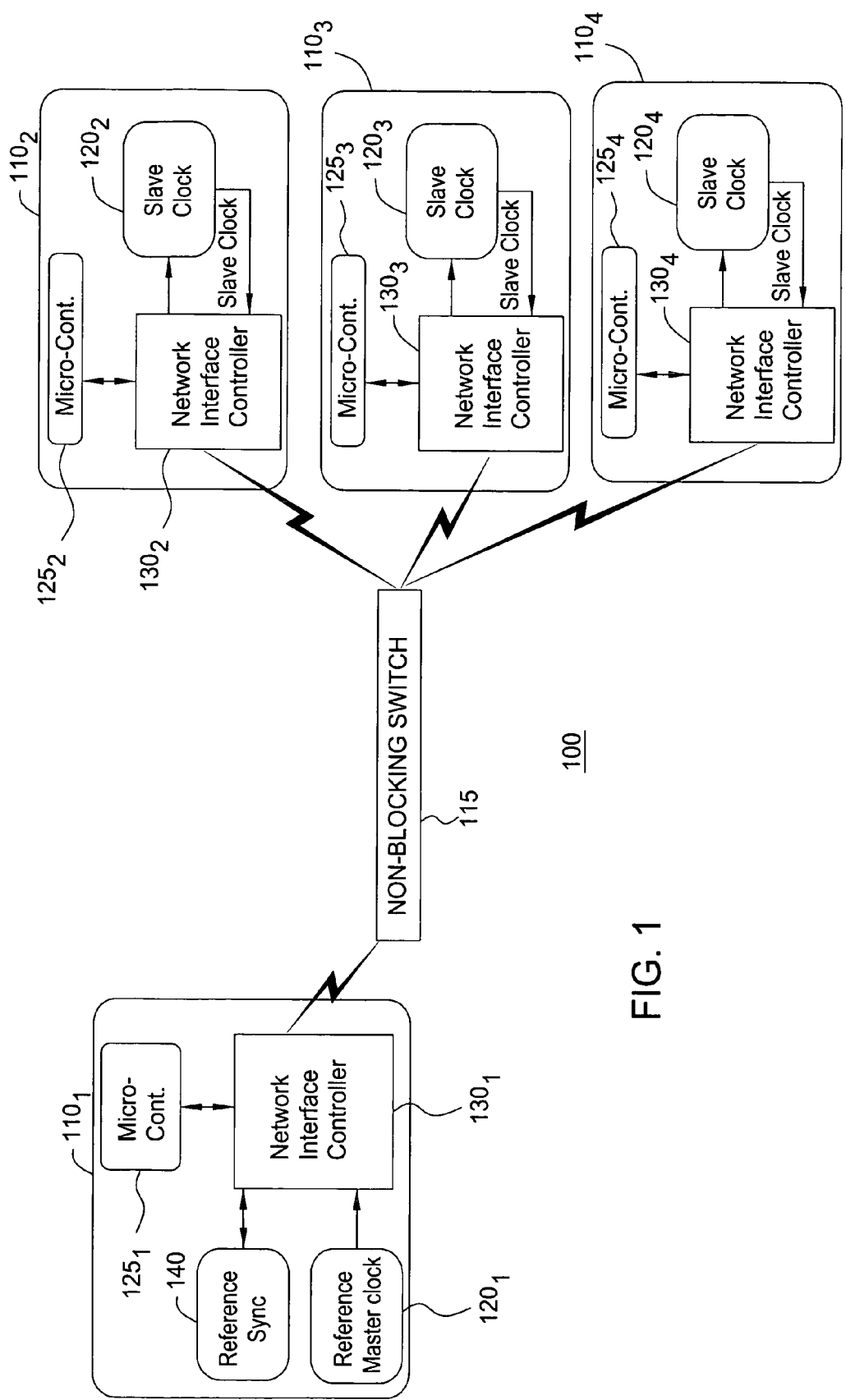
FIG. 1 depicts a high level block diagram of a packet network including clock synchronization in accordance with an embodiment of the present invention.

FIG. 1 depicts a high level block diagram of a packet network including clock synchronization in accordance with an embodiment of the present invention. The packet network 100 of FIG. 1 illustratively comprises a master terminal $110_1$, three slave terminals $110_2$-$110_4$, and a non-blocking switch 115. Each of the terminals comprises a clock, where the master terminal $110_1$ comprises a reference master clock $120_1$ and each of the slave terminals $110_2$-$110_4$ comprises a slave-clock generator $120_2$-$120_4$. The master terminal further comprises a Reference Sync Generator 140 and a micro-controller $125_1$ and each of the slave terminals $110_2$-$110_4$ further comprises a respective micro-controller $125_2$-$125_4$. In the packet network 100 of FIG. 1 in accordance with the present invention, in order to keep data exchange and any circuit means in the network as simplified as possible, the slave-clocks $120_2$-$120_4$ of the slave terminals $110_2$-$110_4$ are synchronized to the master reference clock $120_1$ of the master terminal $110_1$. As depicted in FIG. 1, each of the master terminal $110_1$ and the slave terminals $110_2$-$110_4$ further comprise a respective network interface controller $130_1$-$130_4$. Although the packet network 100 of FIG. 1 illustratively comprises a master terminal and a plurality of slave terminals, in alternate embodiments of the present invention, the concepts of the present invention may be applied in a network comprising a plurality of similar terminals wherein one of the terminals is selected to represent a master terminal having a master clock.

The non-blocking switch 115 of FIG. 1 is known in the art and is essentially a switch that has enough paths across it that a received data packet does not have to be buffered before being switched to an intended receiver. The interconnection of data between the terminals $110_1$-$110_4$ of the packet network 100 of FIG. 1 is accomplished through the non-blocking switch 115, which will not be described in detail herein.

Figure 2:
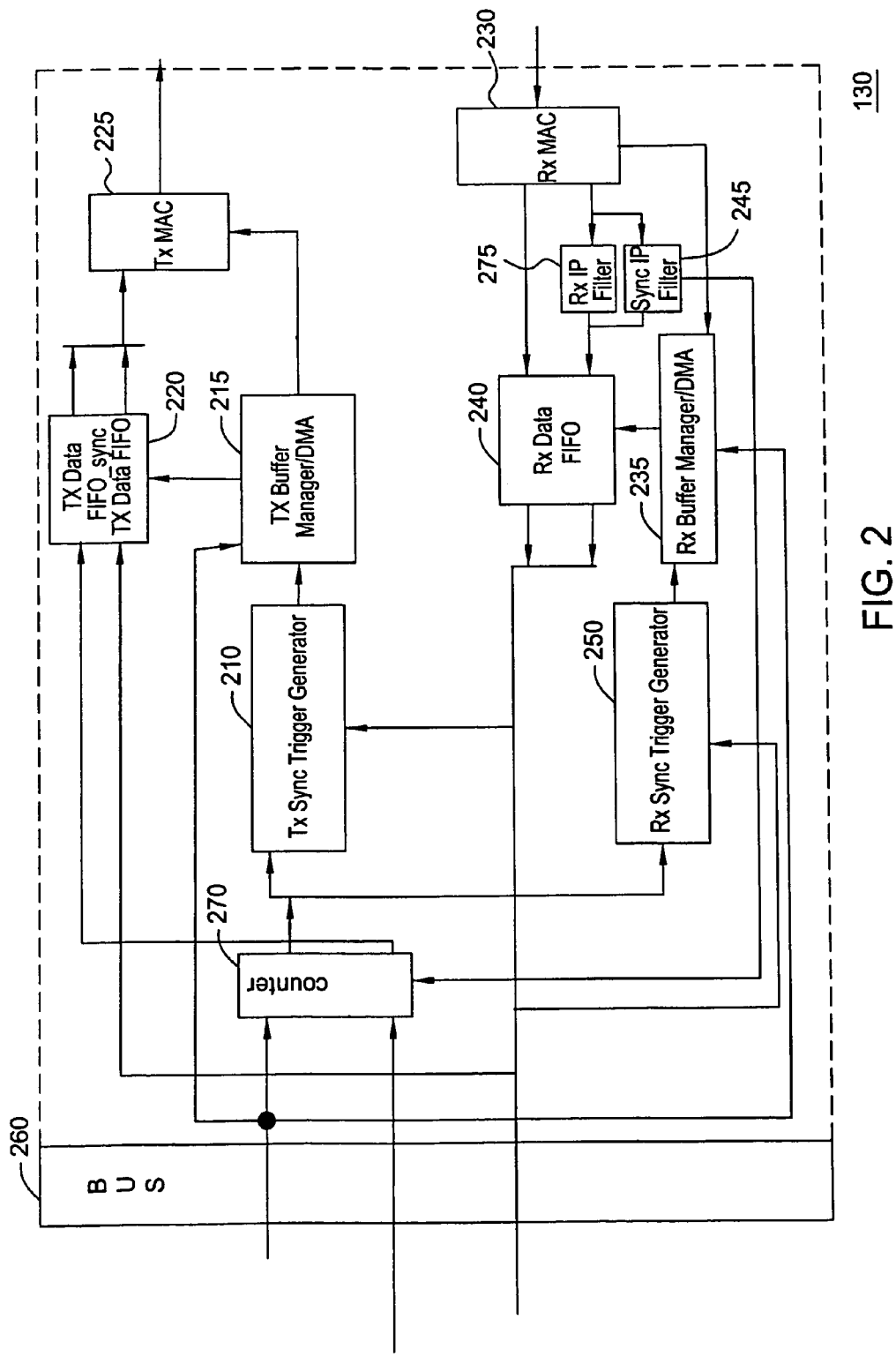
FIG. 2 depicts a high level block diagram of an embodiment of a network interface controller suitable for use in each of the terminals of the packet network of FIG. 1.

FIG. 2 depicts a high level block diagram of an embodiment of a network interface controller 130 suitable for use in each of the terminals $110_1$-$110_4$ of the packet network 100 of FIG. 1. Because each of the interface controllers $130_1$-$130_4$ of the terminals $110_1$-$110_4$ is substantially the same, the network interface controller 130 of FIG. 2 should be considered representative of each of the interface controllers $130_1$-$130_4$ of the packet network 100 of FIG. 1. The network interface controller 130 of FIG. 2 illustratively comprises a Transmit portion and a Receive portion. The Transmit portion of the network interface controller 130 of FIG. 2 illustratively comprises a Transmit Sync Trigger Generator 210, a Transmit Buffer Manager/DMA 215, a Transmit data queue (illustratively a first-in-first-out (FIFO) memory) 220, and a Transmit MAC 225. The Receive portion of the of the network interface controller 130 of FIG. 2 illustratively comprises a Receive MAC 230, a Receive Buffer Manager/DMA 235, a Receive data memory (illustratively a first-in-first-out (FIFO) queue) 240, a Sync filter 245, and a Receive Sync Trigger Generator 250. The network interface controller 130 of FIG. 2 further comprises a Bus Interface 260 common to both the Transmit portion and the Receive portion of the network interface controller and a counter 270. The Receive portion of the network interface controller 130 further comprises a Receive IP filter 275 for recognizing asynchronous data received and manipulating the received data according to conventional protocols.

As previously disclosed, in the packet network 100 of FIG. 1, the clock for the master terminal $110_1$ is provided by the reference master clock $120_1$. This clock supply may be an internal clock or a clock connected to the bus interface 260 residing outside of the master terminal $110_1$. Furthermore, the clock supply present in each of the slave terminals $110_2$-$110_4$, referred to as the slave-clocks $120_2$-$120_4$ may also be internal clocks or external clocks. In accordance with the present invention, the slave-clocks $120_2$-$120_4$ of the slave terminals $110_2$-$110_4$ receive synchronization data from the master terminal $110_1$ in response to a trigger signal from, for example, at least one of the slave terminals $110_2$-$110_4$, such that a slave-clock 120 of a requesting slave terminal $110_2$-$110_4$ may be synchronized to the reference master clock $120_1$ of the master terminal $110_1$.

In the packet network 100 of FIG. 1, a sync initiation signal from the Reference Sync Generator 140 defines a start time for a Sync Time Frame (described in detail below) used in synchronizing the clocks of the slave terminals $110_2$-$110_4$ to the master clock of the master terminal $110_1$. Upon receiving the initiation signal from the Reference Sync Generator 140, the counter 270 of the master terminal $110_1$ is set to a known position (i.e., the counter of the master terminal is reset) and begins to count clock pulses of the reference master clock $120_1$. When the counter 270 of the master terminal counts a predetermined number of clock pulses, the counter of the master terminal $110_1$ sends a signal to the Transmit Sync Trigger Generator 210 of the master terminal to generate a trigger that is communicated from the Transmit Sync Trigger Generator 210 to the Transmit Buffer Manager/DMA 215 to cause a data packet having a Sync Header stored in a specific location of the Transmit Data FIFO 220, illustratively labeled Transmit Data FIFO_-sync, to be transmitted by the TX MAC 225 to one of the slave terminals, for example, the first slave terminal $110_2$. The first predetermined number of clock pulses defines an end of a first Sync Time Frame and the beginning of a second Sync Time Frame. Other data to be transmitted by the network interface controller 130 is stored in the Transmit Data FIFO 220 in a section dedicated for such transmission.

When the counter 270 of the master terminal counts a second predetermined number of clock pulses, the counter of the master terminal $110_1$ sends a second signal to the Transmit Sync Trigger Generator 210 of the master terminal to generate a trigger that is communicated from the Transmit Sync Trigger Generator 210 to the Transmit Buffer Manager/DMA 215 to cause a data packet having a Sync Header to be transmitted by the TX MAC 225 to another one of the slave terminals, for example, the second slave terminal $110_3$. The second predetermined number of clock pulses defines an end of a second Sync Time Frame and the beginning of a third Sync Time Frame. When the counter 270 of the master terminal counts a third predetermined number of clock pulses, the counter of the master terminal $110_1$ sends a signal to the Transmit Sync Trigger Generator 210 of the master terminal to generate a trigger that is communicated from the Transmit Sync Trigger Generator 210 to the Transmit Buffer Manager/DMA 215 to cause a data packet having a Sync Header to be transmitted by the TX MAC 225 to another one of the slave terminals, for example, the third slave terminal $110_4$. The third predetermined number of clock pulses defines an end of the third Sync Time Frame. The predetermined number of counts counted by the counter 270 of the master terminal $110_1$ may be defined by a user or may be a dynamic parameter that may be adjusted by the master terminal $110_1$ depending on the clock accuracy desired in a system (i.e., the more master clock pulses counted in a Sync Time Frame, the greater the accuracy of the synchronization between the master clock and the slave-clocks). In addition to the Sync packet, the respective determined Sync Time Frame is also communicated to an intended slave terminal.

Likewise, when the counter 270 of the master terminal counts the predetermined number of clock pulses as described above, the Receive Sync Trigger Generator 250 of the master terminal $110_1$ generates a trigger that is communicated to the Receive Buffer Manager/DMA 235 to notify the Receive Buffer Manager/DMA 235 that a package will be received from a slave terminal in response to the transmitted Sync packet.

For example, when the first slave terminal $110_2$ receives the data packet having the Sync Header and the Sync Time Frame, the Sync filter 245 of the first slave terminal $110_2$ determines that the data packet having the sync header and the Sync Time Frame has been received from the master terminal $110_1$. In response, the counter 270 of the first slave terminal $110_2$ is set to known position (i.e., the counter 270 is reset). The counter 270 of the first slave terminal $110_2$ then counts the clock pulses of its slave-clock $120_2$ for a period of time equal to the respective Sync Time Frame, for example the first Sync Time Frame, recovered from the transmission from the master terminal $110_1$. At the completion of the first Sync Time Frame, the counter 270 stops counting and the count information is communicated to and stored in the Transmit Data FIFO 220 of the first slave terminal $110_2$. The counter 270 the first slave terminal $110_2$ then communicates a signal to its Transmit Sync Trigger Generator 210 to generate a trigger that is communicated from the Transmit Sync Trigger Generator 210 to the Transmit Buffer Manager/DMA 215 to cause the data packet having the counter information to be transmitted by the TX MAC 225 of the first slave terminal $110_2$ to the master terminal $110_1$.

The data packet transmitted back from the first slave terminal $110_2$ is received by the master terminal $110_1$ and the micro-controller $125_1$ of the master terminal $110_1$ uses the received data packet to determine a round trip delay time for data being transmitted to the first slave terminal $110_2$ and received back from the first slave terminal $110_2$. As such, the time latency for data being transmitted to the first slave terminal $110_2$ from the master terminal $110_1$ is determined. The master terminal $110_1$ then determines an offset for the first slave terminal $110_2$ using the determined relative round trip delay time and transmits the respective offset to the first slave terminal $110_2$ such that the first slave terminal $110_2$ and the master terminal $110_1$ have the same point of reference in time.

The round trip delay time for the other slave terminals, the second slave terminal $110_3$ and the third slave terminal $110_4$, of the packet network 100 are determined in substantially the same manner. For example and as described above, after a second predetermined number of counts of the pulses of the reference master clock $120_1$ of the master terminal $110_1$, the counter 270 of the master terminal $110_1$ sends a signal to the Transmit Sync Trigger Generator 210 the master terminal $110_1$ which generates a trigger signal that is communicated from the Transmit Sync Trigger Generator 210 to the Transmit Buffer Manager/DMA 215 to cause a data packet having a Sync header to be transmitted by the TX MAC 225 to the second slave terminal $110_3$. In addition to the Sync packet, a respective determined Sync Time Frame is also communicated to the second slave terminal $110_3$. As previously described, the signal from the counter 270 is also sent to the Receive Sync Trigger Generator 250 of the master terminal $110_1$ and causes a trigger to be sent from the Receive Sync Trigger Generator 250 to the Receive Buffer Manager/DMA 235 to notify the Receive Buffer Manager/DMA 235 that a package will be received from the second slave terminal $110_3$.

When the second slave terminal $110_3$ receives the data packet having the Sync Header and the second Sync Time Frame, the Sync filter 245 of the second slave terminal $110_3$ determines that the data packet having the Sync header and the Sync Time Frame has been received. In response, the counter 270 of the second slave terminal $110_3$ is set to known position (i.e., the counter 270 is reset). The counter 270 of the second slave terminal $110_3$ then counts the clock pulses of its slave-clock $120_3$ for a period of time equal to the respective Sync Time Frame, for example the second Sync Time Frame, recovered from the transmission from the master terminal $110_1$. At the completion of the second Sync Time Frame, the counter 270 stops counting and the count information is communicated to and stored in the Transmit Data FIFO 220 of the second slave terminal $110_3$. The counter 270 the second slave terminal $110_3$ then communicates a signal to its Transmit Sync Trigger Generator 210 to generate a trigger that is communicated from the Transmit Sync Trigger Generator 210 to the Transmit Buffer Manager/DMA 215 to cause the data packet having the counter information to be transmitted by the TX MAC 225 to the master terminal $110_1$.

As before, the data packet transmitted back from the second slave terminal $110_3$ is received by the master terminal $110_1$ where the micro-controller $125_1$ of the master terminal $110_1$ uses the received data packet to determine a round trip delay for a data packet being transmitted to the second slave terminal $110_3$ and received back from the second slave terminal $110_3$. As such, the time latency for data being transmitted to the second slave terminal $110_3$ from the master terminal $110_1$ is determined. The master terminal $110_1$ then determines an offset for the second slave terminal $110_3$ using the determined relative round trip delay time and transmits the respective offset to the second slave terminal $110_3$ such that each the second slave terminal $110_3$ and the master terminal $110_1$ have the same point of reference in time. The round trip delay times and the offsets for each of the slave terminals of a packet network in accordance with the present invention are determined in substantially the same manner using respective Sync Time Frames. The round trip delay measurement and offsets for the slave terminals $110_2$-$110_4$ is typically only required to be performed once, although, in alternate embodiments of the present invention where network conditions are changing, the round trip delay measurements may be performed periodically, for example, by the master terminal or may be performed by the master terminal in response to a trigger signal from at least one of the slave terminals.

Figure 3:
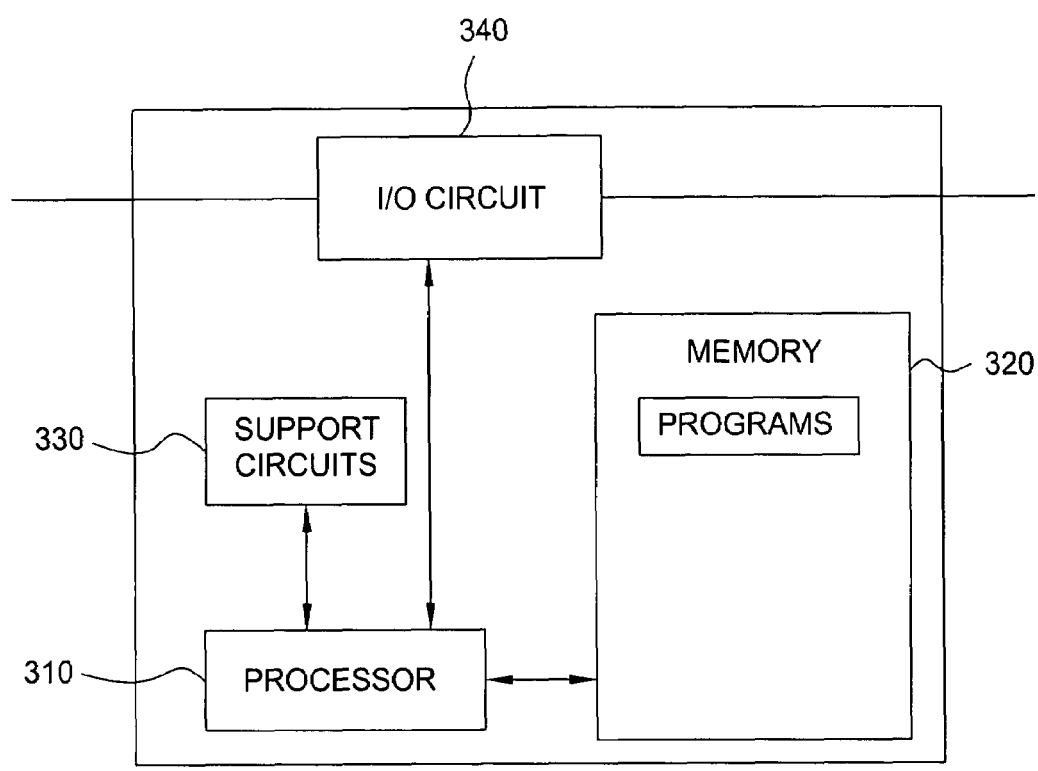
FIG. 3 depicts a high level block diagram of an embodiment of a micro-controller suitable for use in the master terminal and the slave terminals of the packet network of FIG. 1.

FIG. 3 depicts a high level block diagram of an embodiment of a micro-controller suitable for use in the master terminal $110_1$ and the slave terminals $110_2$-$110_4$ of the packet network 100 of FIG. 1. Because each of the micro-controllers $125_1$-$125_4$ of the master terminal $110_1$ and the slave terminals $110_2$-$110_4$ is substantially the same, the micro-controller 125 of FIG. 3 should be considered representative of each of the micro-controllers $125_1$-$125_4$ of the master terminal $110_1$ and the slave terminals $110_2$-$110_4$ of the packet network 100 of FIG. 1. The micro-controller 125 of FIG. 3 comprises a processor 310 as well as a memory 320 for storing information, algorithms and control programs. The processor 310 cooperates with conventional support circuitry 330 such as power supplies, clock circuits, cache memory and the like as well as circuits that assist in executing the software routines stored in the memory 320. As such, it is contemplated that some of the process steps discussed herein as software processes may be implemented within hardware, for example, as circuitry that cooperates with the processor 310 to perform various steps. The micro-controller 125 also contains input-output circuitry 340 that forms an interface between the various functional elements communicating with the micro-controller 125.

Although the micro-controller 125 of FIG. 3 is depicted as a general purpose computer that is programmed to perform various control functions in accordance with the present invention, the processes of the micro-controller 125 may be implemented in hardware, for example, as an application specified integrated circuit (ASIC). As such, the process steps described herein are intended to be broadly interpreted as being equivalently performed by software, hardware, or a combination thereof.

In addition to determining the round trip delay time for each of the slave terminals, the initial data packets received from each of the slave terminals $110_2$-$110_4$ are used by the micro-controller $125_1$ of the master terminal $110_1$ to compare the slave-clock status (i.e., the count of the respective counter of each of the slave terminals) to the status of the master clock (i.e., the count of the counter of the master terminal $110_1$ for each of the respective Sync Time Frames) to determine the offset between the reference master clock $120_1$ of the master terminal $110_1$ and the respective slave-clocks $120_2$-$120_4$ of the slave terminals $110_2$-$110_4$. For example, when the master terminal $110_1$ receives the data packet back from the first slave terminal $110_2$ in response to the Sync data packet and, for example, the first Sync Time Frame, sent from the master terminal $110_1$ to the first slave terminal $110_2$ as described above, the returned data packet from the first slave terminal $110_2$ contains information of the state of the counter (i.e., the number of slave-clock pulses counted) of the first slave terminal $110_2$. The micro-controller $125_1$ of the master terminal $110_1$ compares the state of the counter (i.e., the number of clock pulses) of the first slave terminal $110_2$ to the counter of the master terminal $110_1$ and determines how far the counter of the first slave terminal $110_2$, which represents the state of the slave-clock of the first slave terminal $110_2$, is offset from the reference master clock $120_1$ taking into account the round trip delay time determined for the first slave terminal $110_2$.

More specifically, in one embodiment of the present invention, the slave-clock information from the first slave terminal $110_2$ is compared to the master clock information for the respective Sync Time Frame, for the example above the first Sync Time Frame. The representative pulses of the slave-clock of the first slave terminal $110_2$ are shifted by an amount proportional to the respective determined round trip delay time such that the counted clock pulses of the master clock $120_1$ during the first Sync Time Frame and the counted clock pulses of the first slave terminal $110_2$ during the first Sync Time Frame have the same point of reference in time. The phase of the clock pulses of the master clock $120_1$ are then compared to the phase of the clock pulses of the first slave terminal $110_2$. If the phases are offset, the micro-controller $125_1$ of the master terminal $110_1$ determines and records a phase offset amount for the slave-clock $120_2$ of the first slave terminal $110_2$. The counted clock pulses received from the first slave terminal $110_2$ are then offset by an amount equal to the offset determined by the master terminal $110_1$. The number of clock pulses of the master clock $120_1$ counted during the first Sync Time Frame are then compared to the number of clock pulses of the slave-clock counted by the counter of the first slave terminal $110_2$ during the first Sync Time Frame. If the numbers of clock pulses are different, the micro-controller $125_1$ of the master terminal $110_1$ determines and records a frequency offset amount for the slave-clock $120_2$ of the first slave terminal $110_2$. The micro-controller $125_1$ of the master terminal $110_1$ then determines a sync signal, incorporating the phase offset and frequency offset, to transmit to the first slave terminal $110_2$. Upon receiving the sync signal from the master terminal $110_1$, the micro-controller $125_2$ of the first slave terminal $110_2$ generates a control signal to adjust the slave-clock $120_2$ an amount proportional to the sync signal generated by the master terminal $110_1$ to synchronize the slave-clock $120_2$ of the first slave terminal $110_2$ to the reference master clock $120_1$ of the master terminal $110_1$. The slave-clocks $120_3$-$120_4$ of the remaining slave terminals $110_3$-$110_4$ are synchronized to the master clock $120_1$ of the master terminal in substantially the same manner but using the slave-clock information of the slave terminals $110_3$-$110_4$ recorded during the respective Sync Time Frames.

Although the embodiment described above depicts a specific method having ordered steps for determining a sync signal to synchronize the clock of the slave terminals to the master clock of the master terminal, the specific embodiment should not be treated as limiting the scope of the invention. It will be appreciated by those skilled in the art informed by the teachings of the present invention that various other methods and procedures may be implemented within the concepts of the present invention for determining a phase offset and a frequency offset between at least two clock signals. Furthermore, although in the embodiment of the invention described above it is described that the slave-clocks are offset by a particular amount to synchronize the slave-clocks of the slave terminals to the master clock of the master terminal, also within the concepts of the present invention, the rate of the slave-clocks of the slave terminals may be increased or decreased to synchronize the slave-clocks of the slave terminals to the master clock of the master terminal.

In an embodiment of the present invention, for subsequent synchronizations of slave-clocks of slave terminals of a packet network to a master clock of a master terminal (i.e., synchronizations initiated by transmissions other than the initial transmission of a data packet with a Sync header and Sync Time Frame from the master terminal $110_1$ to the slave terminals $110_2$-$110_4$) the respective counters of each of the slave terminals $110_2$-$110_4$ are adapted to generate a signal after a respective predetermined number of counts, the signal being operative to cause the respective Transmitter Sync Trigger Generators of the slave terminals $110_2$-$110_4$ to generate a trigger signal. The trigger signal from the respective Transmitter Sync Trigger Generators are communicated to the respective Transmit Buffer Manager/DMAs to cause a respective data packet having a Sync Header to be transmitted from respective ones of the slave terminals $110_2$-$110_4$ to the master terminal $110_1$ during the respective time intervals determined by the respective counters. For example, after a predetermined number of counts, the counter of the first slave terminal $110_2$ generates a signal which is communicated to the Transmitter Sync Trigger Generator 210 of the first slave terminal $110_2$. The signal communicated to the Transmitter Sync Trigger Generator causes the Transmitter Sync Trigger Generator of the first slave terminal $110_2$ to generate a trigger signal that is communicated to the Transmit Buffer Manager/DMA 215 causing a data packet stored in the Transmit Data FIFO 320 having a Sync Header to be transmitted by the TX MAC 225 of the first slave terminal $110_2$ to the master terminal $110_1$. As previously disclosed, a trigger is also generated by the Receive Sync Trigger Generator 250 of the first slave terminal $110_2$ and communicated to the Receive Buffer Manager/DMA 235 to notify the Receive Buffer Manager/DMA 235 that a package will be received from the master terminal $110_1$ in response to the transmitted Sync packet. The respective predetermined number of counts counted by the respective counters of the slave terminals $110_2$-$110_4$ implemented for initiating synchronization may be defined by a user or may be a dynamic parameter that may be adjusted by, for example respective micro-controllers, depending on the clock accuracy desired in a system (i.e., the smaller the predetermined number of counts initiating synchronization the more often the synchronization procedure is performed). In addition, the respective predetermined number of counts counted by the respective counters of the slave terminals $110_2$-$110_4$ implemented for initiating synchronization may be adjusted during the life of a system to initially perform synchronization more frequently and as the system settles to perform synchronizations less frequently.

Upon receiving the data packet having the Sync Header, the Sync filter 245 of the master terminal $110_1$ determines that the data packet having the Sync header has been received. In response, the counter 270 of the master terminal $110_1$ is set to a known position (i.e., the counter 270 is reset) upon receiving a signal from the Reference Sync Generator 140. As previously disclosed, the received signal from the Reference Sync Generator defines the start of a Sync Time Frame. The counter 270 of the master terminal $110_1$ then begins to count clock pulses of the reference master clock $120_1$. When the counter 270 of the master terminal counts a predetermined number of clock pulses, the counter of the master terminal $110_1$ sends a signal to the Transmit Sync Trigger Generator 210 of the master terminal to generate a trigger that is communicated from the Transmit Sync Trigger Generator 210 to the Transmit Buffer Manager/DMA 215 to cause a data packet having a Sync Header to be transmitted by the TX MAC 225 to the first slave terminal $110_2$. As previously disclosed, the first predetermined number of clock pulses defines an end of the Sync Time Frame. In addition to the Sync packet, the Sync Time Frame is also communicated to the first slave terminal $110_2$ (i.e., the slave terminal initiating the synchronization of the clocks).

When the first slave terminal $110_2$ receives the data packet having the Sync Header and the Sync Time Frame, the Sync filter 245 of the first slave terminal $110_2$ determines that the data packet having the sync header and the Sync Time Frame has been received from the master terminal $110_1$. In response, the counter 270 of the first slave terminal $110_2$ is set to known position (i.e., the counter 270 is reset). The counter 270 of the first slave terminal $110_2$ then counts the clock pulses of its slave-clock $120_2$ for a period of time equal to the Sync Time Frame recovered from the transmission from the master terminal $110_1$. At the completion of the first Sync Time Frame, the counter 270 stops counting and the count information is communicated to and stored in the Transmit Data FIFO 220 of the first slave terminal $110_2$. The counter 270 the first slave terminal $110_2$ then communicates a signal to its Transmit Sync Trigger Generator 210 to generate a trigger that is communicated from the Transmit Sync Trigger Generator 210 to the Transmit Buffer Manager/DMA 215 to cause the data packet having the counter information to be transmitted by the TX MAC 225 to the master terminal $110_1$.

The synchronization procedure then continues as disclosed above for the initial synchronization procedure. Briefly stated, the example of a subsequent synchronization procedure disclosed above defines that a trigger signal (i.e., the transmission of a respective Sync Packet from a respective slave terminal after a predetermined number of counts) from any of the slave terminals $110_2$-$110_4$ is operative for causing the synchronization procedure of the present invention to occur as disclosed above for the initial synchronization procedure. It should be noted, however, in alternate embodiments of the present invention, multi-frame triggers may be implemented. More specifically, to account for and accommodate different data rates that may occur in a network in accordance with the present invention, the Transmit Sync Generator and the Receive Sync Generator of a slave terminal may be adapted to generate a trigger for, for example, every other time a predetermined count number is reached instead of every time. That is, the Transmit Sync Generator and the Receive Sync Generator of a slave terminal may be adapted to generate a trigger after a certain number of times a predetermined count number has been counted by a respective counter (instead of generating a trigger each time a predetermined count number is counted). Even further, some slave terminals may be configured to operate on a multi-frame basis while others are configured to operate on a single frame basis.

In an alternate embodiment of the present invention, for subsequent synchronizations of slave-clocks of slave terminals of a packet network to a master clock of a master terminal (i.e., synchronizations initiated by transmissions other than the initial transmission of a data packet with a Sync header and the Sync Time Frame from the master terminal $110_1$ to the slave terminals $110_2$-$110_4$), an initiation pulse generated by the Reference Sync Generator 140 is periodically repeated such that the slave-clocks $120_2$-$120_4$ of the slave terminals $110_2$-$110_4$ are periodically synchronized to the reference master clock $120_1$ of the master terminal $110_1$. More specifically, the initiation synchronization procedure of the present invention as disclosed above may be periodically repeated (i.e., with the exception of the determination of the round trip delay times for each of the slave terminals) according to a synchronization schedule determined by the Reference Sync Generator 140 and the transmission of an initiation pulse (i.e., the beginning of a first Sync Time Frame). The period for the repetition of the initiation pulse generated by the Reference Sync Generator 140 is a dynamic parameter that may be determined by a user which depends on, at least, the accuracy of the clock synchronization desired in a particular network or system.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. A method for synchronizing clocks of network terminals in a network, comprising:
   selecting a clock of one of said network terminals to be a master clock;
   determining a respective round trip delay time from said network terminal having said master clock to each of said other terminals;
   adapting operation of the clock of each of said other terminals by an amount proportional to the respective determined round trip delay time such that said network terminal having said master clock and each of said other terminals have substantially the same point of reference in time; and
   in response to at least one trigger signal, determining a respective offset between the master clock and the clocks of each of said other terminals and adapting operation of the clocks of each of said other terminals by an amount proportional to said determined respective offset to synchronize the clocks of each of said other terminals to said master clock.

2. The method of claim 1, wherein said selected network terminal comprises a master terminal.

3. The method of claim 1, wherein said other network terminals comprise slave terminals.

4. The method of claim 1, wherein said determining a respective round trip delay time, comprises:
   transmitting a respective data packet from said terminal including the master clock to each of said other terminals; and
   determining, from respective data packets received from each of said other terminals in response to said transmitted respective data packets, a respective amount of time for data packets to be transmitted to and received from each of said other terminals.

5. The method of claim 1, wherein said respective offset for each of the other terminals is determined comprising:
   in response to a synchronization signal, counting a predetermined number of clock pulses of said master clock;
   counting clock pulses of the clocks of said other terminals for a period of time equal to the amount of time for counting said predetermined number of clock pulses of said master clock and beginning at a point in time of said synchronization signal; and
   comparing the phase and frequency of the counted clock pulses of each of the other terminals to the clock pulses of said master terminal to determine a respective offset.

6. The method of claim 1, wherein each of said other terminals respectively triggers the synchronization of its respective clock to the master clock.

7. A network for synchronizing clocks of network terminals in said network, comprising:
   a synchronization device for providing a timing signal;
   a master terminal, including:
   a master clock for providing timing information for said master terminal;
   a master network interface controller for transmitting data from and receiving data for said master terminal; and
   a master control unit for determining synchronization parameters;

a plurality of slave terminals, each of said slave terminals including:

a slave-clock for providing timing information for said slave terminal;

a slave controller for making adjustments to said slave-clock in response to a control signal indicative of a difference between said master clock and said slave-clock; and a slave network interface controller for transmitting data from and receiving data for said slave terminal; and a non-blocking switch for interconnecting said master terminal and said plurality of slave terminals;

wherein said master control unit comprises a memory and a processor and is adapted to perform a method comprising:

determining a respective round trip delay time for each of said plurality of slave terminals;

communicating a control signal to respective slave controllers of the plurality of slave terminals for adapting operation of the slave-clock of each of said slave terminals by an amount proportional to the respective determined round trip delay time such that said master terminal and each of said slave terminals have substantially the same point of reference in time;

determining a respective offset between the master clock and a respective slave-clock of each of said slave terminals in response to information received from each of said slave terminals regarding a status of the respective slave-clocks; and adapting operation of respective slave-clock of each of said slave terminals by an amount proportional to said determined respective offset to synchronize the slave-clock of each of said slave terminals to the master clock of said master terminal.

8. The network of claim 7, wherein each of said network interface controllers comprises:

a counting device for generating a signal in response to counting a predetermined number of counts;

a transmit trigger generator for receiving the signal from said counter and, in response, generating a transmit trigger signal;

a transmit memory device, for storing data to be transmitted;

a transmit memory manager for receiving the transmit trigger signal from said transmit trigger generator and, in response, directing at least a portion of said data stored in said memory device to a transmission device for transmission of said data;

a receive trigger generator for receiving the signal from said counter and, in response, generating a receive trigger signal;

a receive memory device, for storing received data; and a receive memory manager for receiving the receive trigger signal from said receive trigger generator and, in response, directing received data to a location within said receive memory device.

9. The network of claim 8, wherein each of said counting devices begins counting from a predetermined count number in response to a timing signal from said synchronization device.

10. The network of claim 7, wherein said synchronization device generates a time frame for the synchronization of the respective slave-clocks of said plurality of slave terminals to the master clock of said master terminal.

11. The network of claim 7, wherein said master terminal transmits a data packet having a Sync header and a timing signal to each of said plurality of slave terminals to cause each of said slave terminals to transmit information regarding a status of their respective slave-clocks to the master terminal.

* * * * *